(12) United States Patent
Nemchinov et al.

(10) Patent No.: US 12,347,010 B2
(45) Date of Patent: *Jul. 1, 2025

(54) SINGLE IMAGE-BASED REAL-TIME BODY ANIMATION

(71) Applicant: Snap Inc., Santa Monica, CA (US)

(72) Inventors: Egor Nemchinov, London (GB); Sergei Gorbatyuk, London (GB); Aleksandr Mashrabov, Los Angeles, CA (US); Egor Spirin, Saint-Petersburg (RU); Iaroslav Sokolov, Saint-Petersburg (RU); Andrei Smirdin, Saint-Petersburg (RU); Igor Tukh, Saint-Petersburg (RU)

(73) Assignee: Snap Inc., Santa Monica, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/214,538

(22) Filed: Jun. 27, 2023

(65) Prior Publication Data

US 2023/0343012 A1    Oct. 26, 2023

Related U.S. Application Data

(63) Continuation of application No. 17/695,902, filed on Mar. 16, 2022, now Pat. No. 11,727,617, which is a (Continued)

(51) Int. Cl.
| | | |
|---|---|---|
| *G06T 13/40* | (2011.01) | |
| *G06N 3/08* | (2023.01) | |
| *G06T 3/067* | (2024.01) | |
| *G06T 7/194* | (2017.01) | |
| *G06T 15/04* | (2011.01) | |
| *G06T 17/20* | (2006.01) | |

(52) U.S. Cl.
CPC ............... *G06T 13/40* (2013.01); *G06N 3/08* (2013.01); *G06T 3/067* (2024.01); *G06T 7/194* (2017.01); *G06T 15/04* (2013.01); *G06T 17/20* (2013.01)

(58) Field of Classification Search
None
See application file for complete search history.

(56) References Cited

U.S. PATENT DOCUMENTS

2010/0111370 A1* 5/2010 Black .................. G06F 18/2321
                                                            705/26.1
2012/0019517 A1* 1/2012 Corazza ................. G06T 17/20
                                                            345/419

(Continued)

*Primary Examiner* — David H Chu
(74) *Attorney, Agent, or Firm* — Georgiy L. Khayet

(57) ABSTRACT

Systems and methods for single image-based body animation are provided. An example method includes receiving an input image including an image of a body of a person, fitting a model to the image of the body of the person, where the model is configured to receive a set of pose parameters corresponding to a pose of the body and generate, based on the set of pose parameters, an output image including an image of the body adopting the pose, receiving a further set of pose parameters corresponding to a further pose of the body, providing the further set of pose parameters to the model to generate the output image of the body adopting the further pose, and generating, based on the output image, a frame of an output video including the output image.

20 Claims, 16 Drawing Sheets

Related U.S. Application Data continuation of application No. 17/062,309, filed on Oct. 2, 2020, now Pat. No. 11,308,676, which is a continuation of application No. 16/434,185, filed on Jun. 7, 2019, now Pat. No. 10,839,586.

(56) References Cited

U.S. PATENT DOCUMENTS

| | | | |
|---|---|---|---|
| 2013/0330060 A1* | 12/2013 | Seidel | H04N 5/262 386/280 |
| 2016/0110595 A1* | 4/2016 | Wang | G06T 7/60 705/27.2 |
| 2017/0032560 A1* | 2/2017 | Dionne | G06T 19/20 |
| 2024/0203078 A1* | 6/2024 | Hajmohammadi | G06T 17/20 |

* cited by examiner

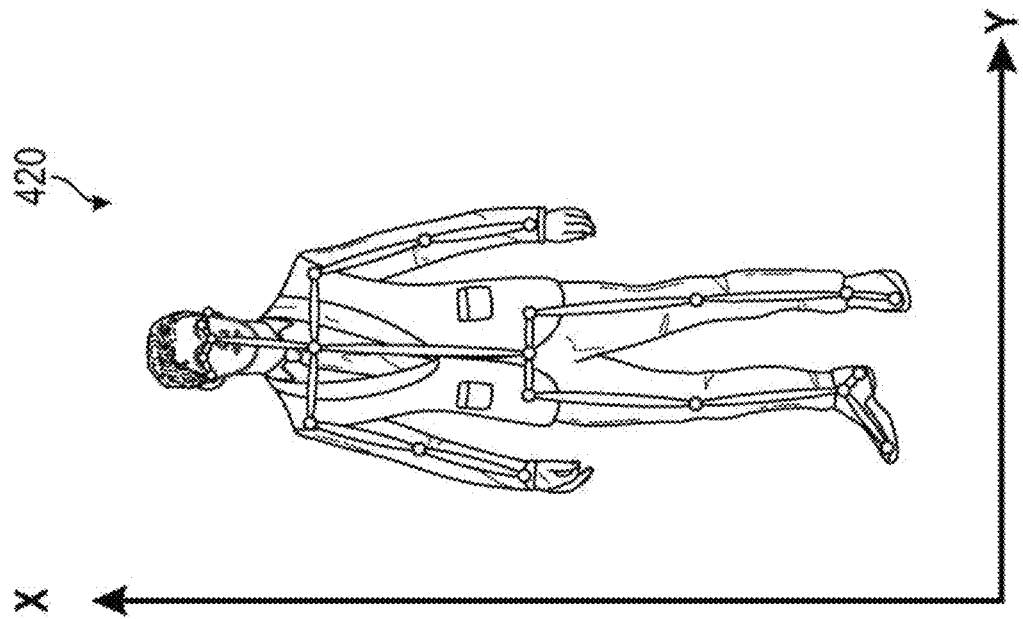
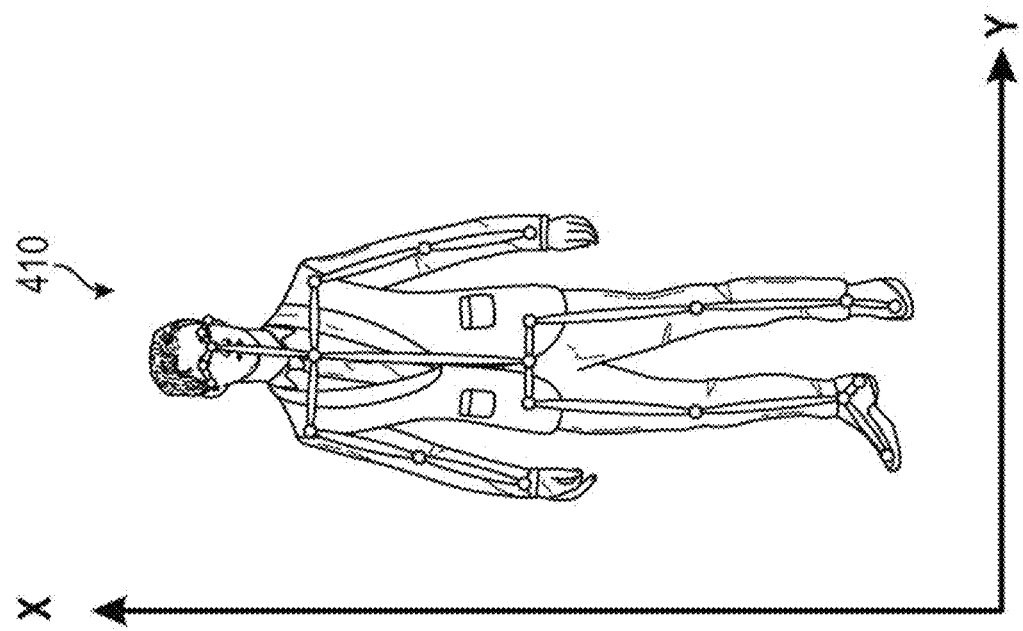
FIG. 4

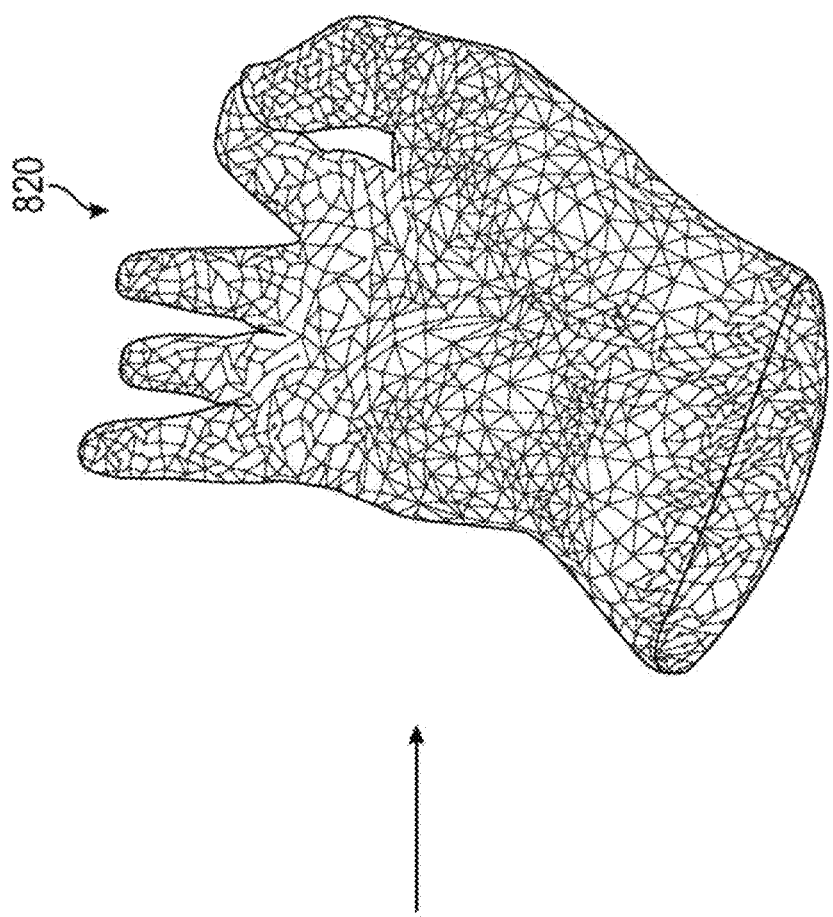
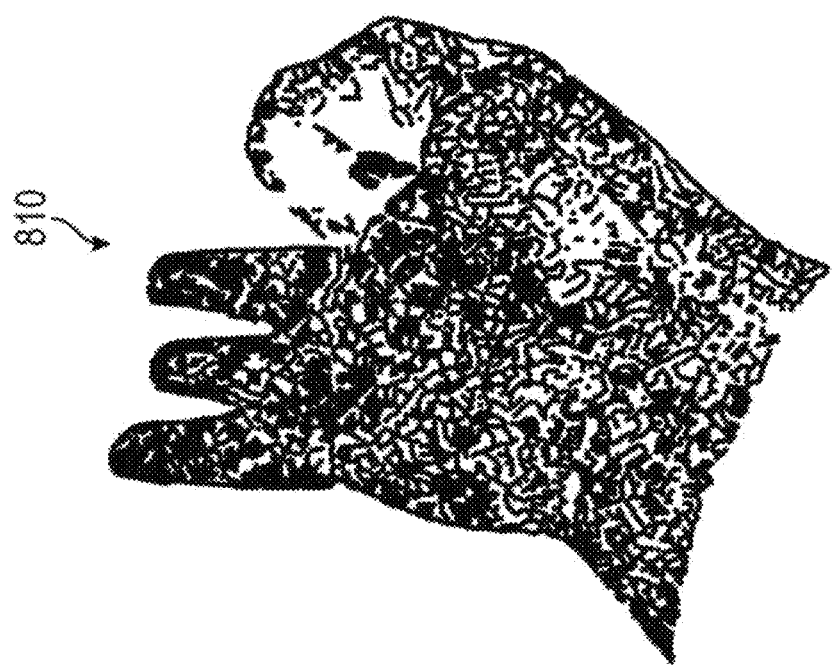
FIG. 8

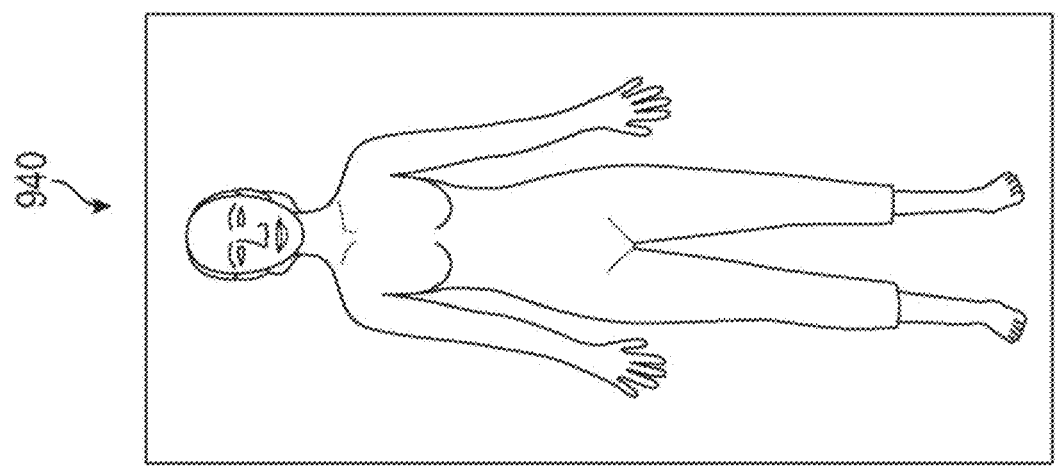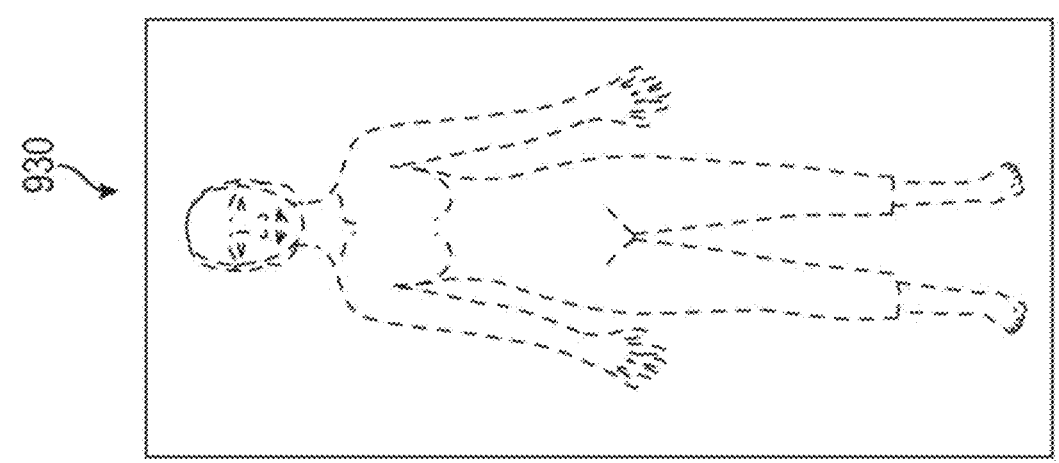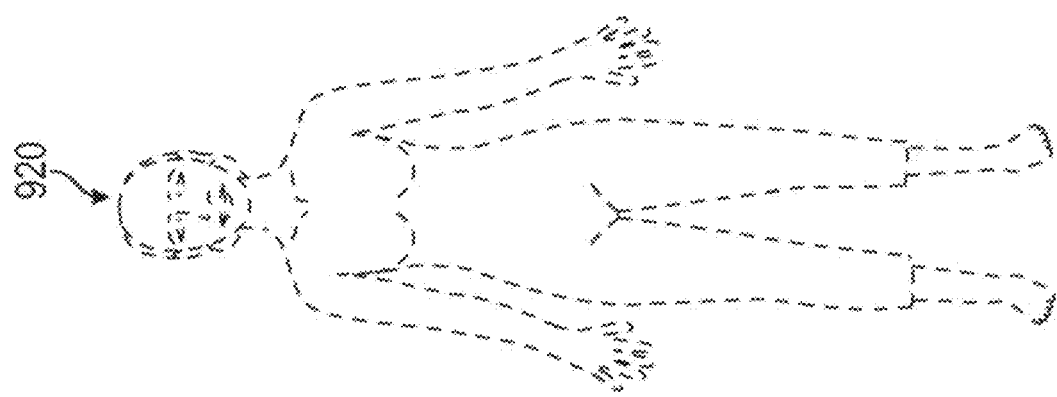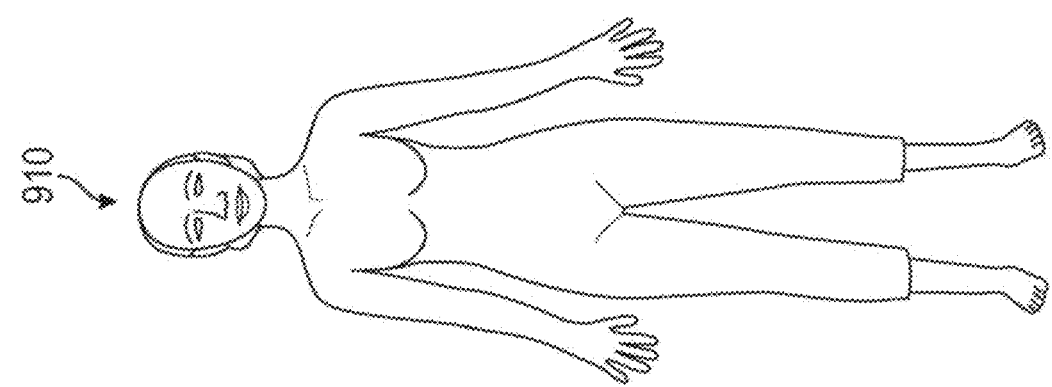
FIG. 9

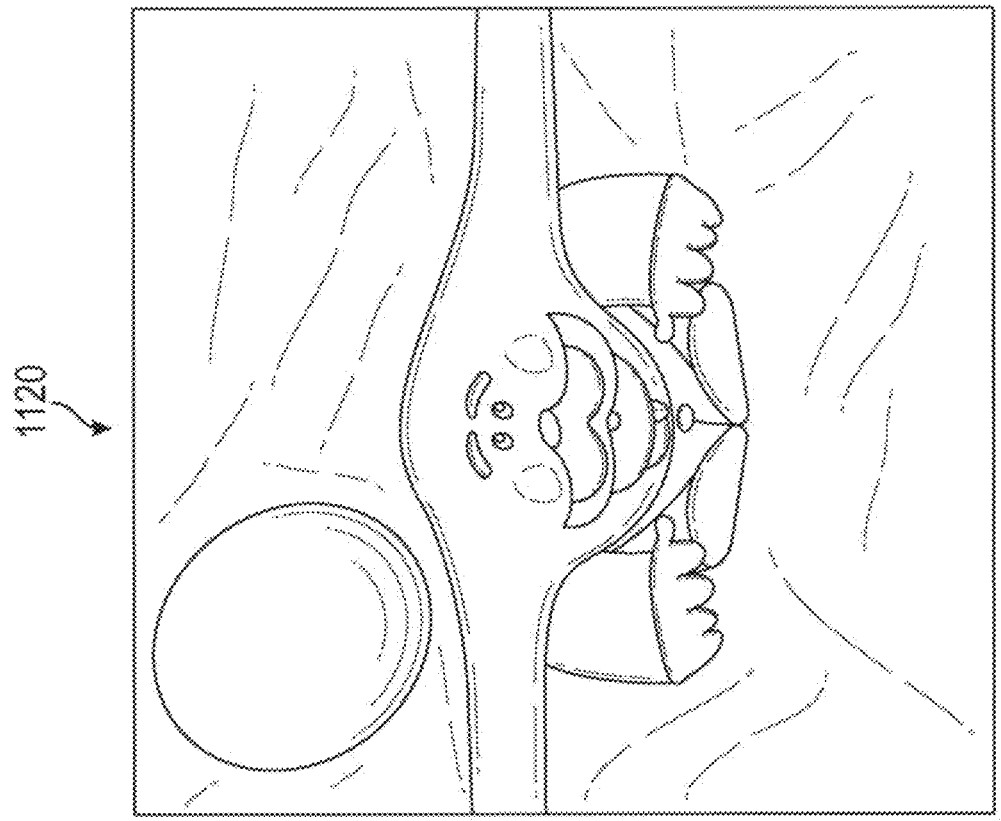
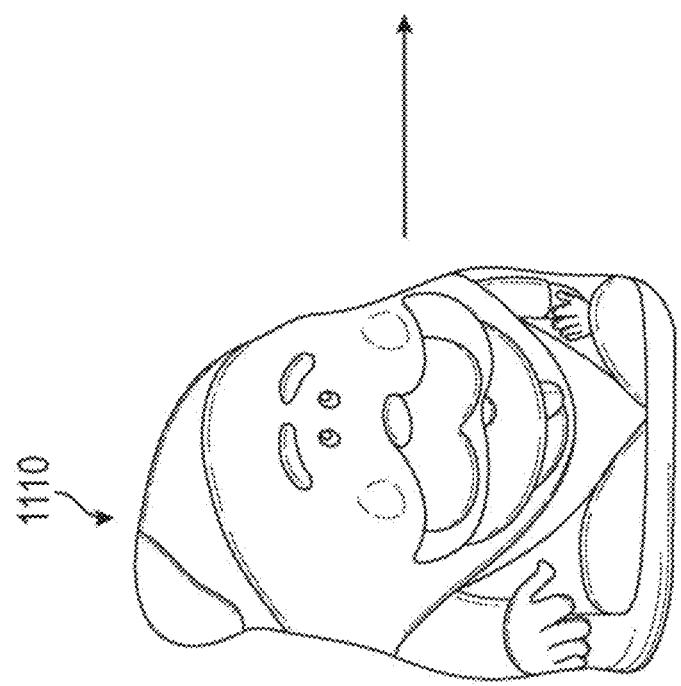
FIG. 11

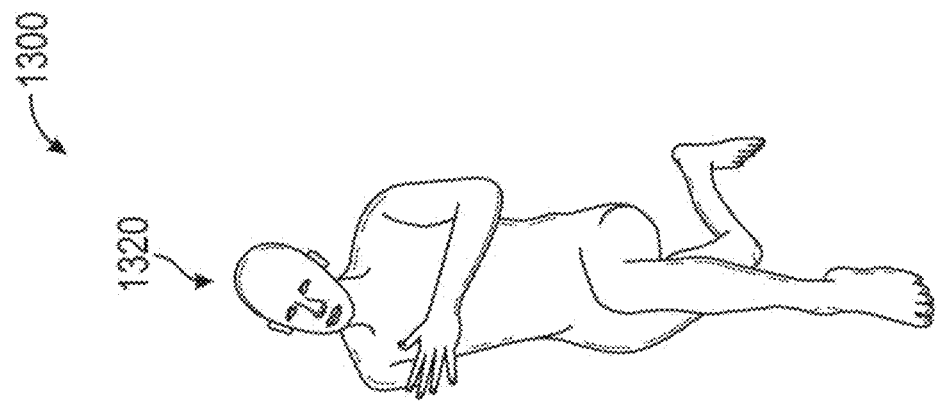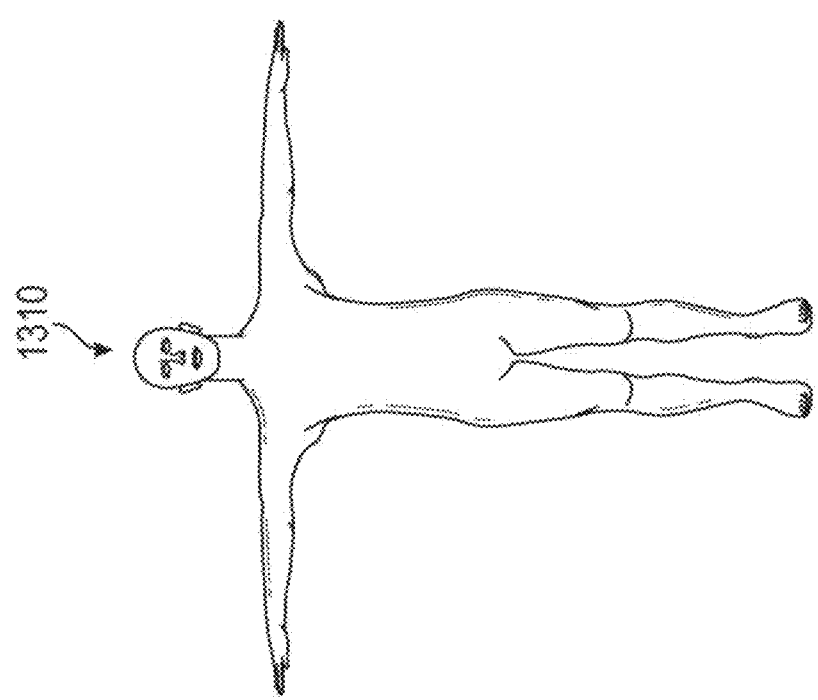
FIG. 13

SINGLE IMAGE-BASED REAL-TIME BODY ANIMATION

CROSS-REFERENCE TO RELATED APPLICATION

This application is a Continuation of, and claims the priority benefit of, U.S. patent application Ser. No. 17/695,902, entitled "SINGLE IMAGE-BASED REAL-TIME BODY ANIMATION," filed on Mar. 16, 2022, which in turn is a Continuation of, and claims the priority benefit of, U.S. patent application Ser. No. 17/062,309, entitled "SINGLE IMAGE-BASED REAL-TIME BODY ANIMATION," filed on Oct. 2, 2020, which in turn is a Continuation of, and claims the priority benefit of, U.S. patent application Ser. No. 16/434,185, entitled "SINGLE IMAGE-BASED REAL-TIME BODY ANIMATION," filed on Jun. 7, 2019. The subject matter of aforementioned Applications is incorporated herein by reference in its entirety for all purposes.

TECHNICAL FIELD

This disclosure generally relates to digital image processing. More particularly, this disclosure relates to methods and systems for single image-based real-time body animation.

BACKGROUND

Body animation can be used in many applications, such as advertisements, entertainment shows, social media networks, computer games, videos, video conversations, virtual reality, augmented reality, and the like. An animation of a body of a person based on a single photograph can be specifically useful in various applications. For example, a person on the photograph can "come alive" by performing movements similar to a real video, for example, dancing, performing acrobatics, fighting, and so forth. Animation of the body of a person based on a single photograph entails creating a realistic model of a body of a particular person and having the model perform actions or interactions within scenes.

BRIEF DESCRIPTION OF THE DRAWINGS

Embodiments are illustrated by way of example and not limitation in the figures of the accompanying drawings, in which like references indicate similar elements.

FIG. 4 shows an example graph of key points.

FIG. 8 shows an example point cloud and a mesh generated based on the point cloud.

FIG. 9 shows an example warped depth map, an example warped normal map, an example point cloud generated based on the warped depth map and warped normal map, and an example mesh generated based on the point cloud.

FIG. 11 shows a process of UV unwrapping of an example 3D surface to a 2D surface.

FIG. 13 shows an animation of an example 3D model.

DETAILED DESCRIPTION

Figure 1:
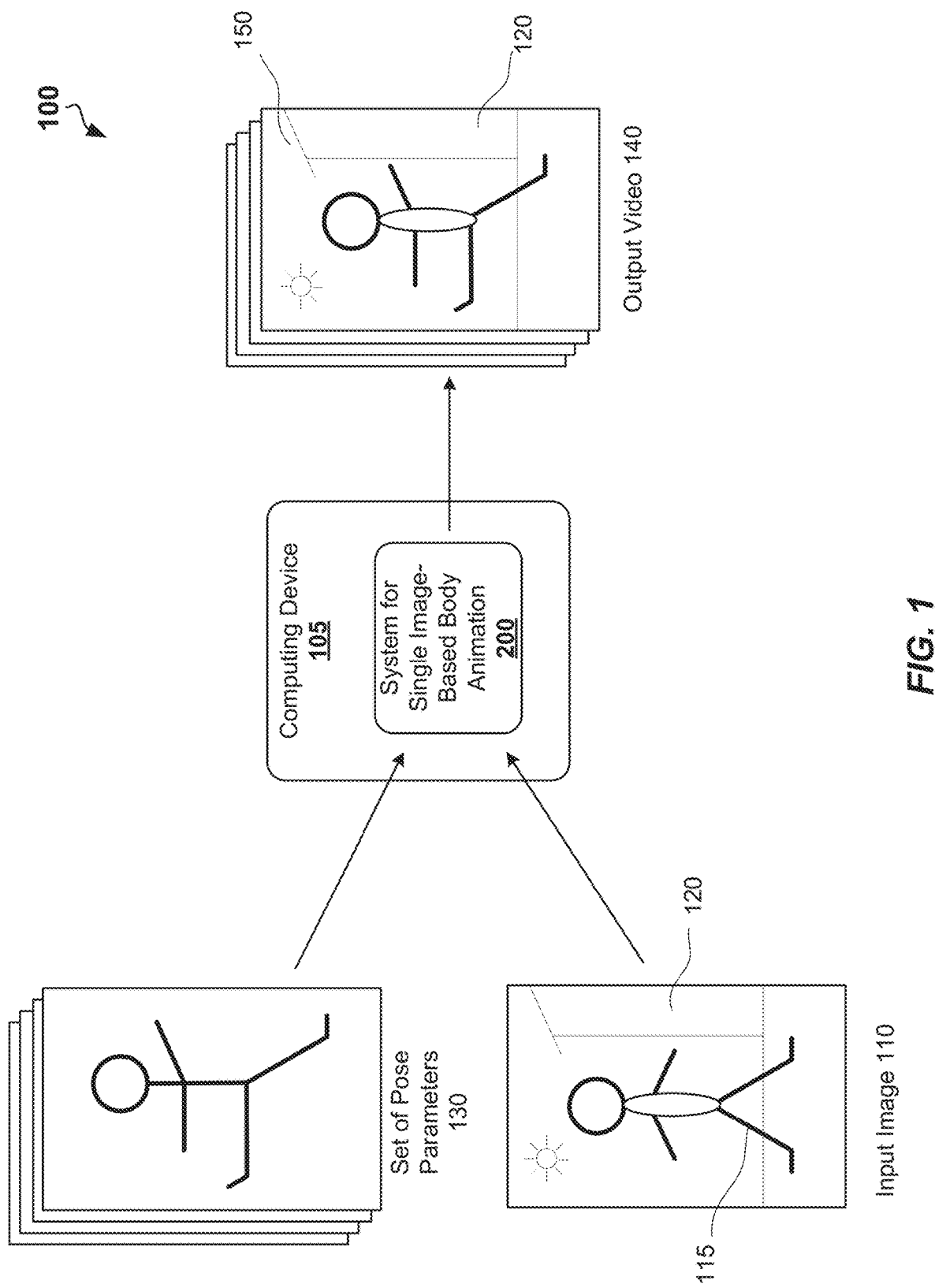
FIG. 1 is a block diagram showing an example environment, wherein a method for single image-based real-time body animation can be practiced.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure can be implemented using a variety of technologies. For example, methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium. It should be noted that methods disclosed herein can be implemented by a computing device such as a mobile device, personal computer, server, network node, and so forth.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to methods and systems for single image-based real-time body animation. The methods and systems of the present disclosure can be designed to work on mobile devices, such as smartphones, tablet computers, or mobile phones, in real-time and without connection to the Internet or the need for use of server-side computational resources, although the embodiments can be extended to approaches involving web service or a cloud-based resources.

Some embodiments of the disclosure may allow real-time animation of a body of a person based on a single input image. The input image can be segmented to obtain a segmentation mask for the body. The input image can be analyzed to obtain a graph of key points representing joints of the body and recover a pose of the body. A generic model can be fitted to the input image of the body and the graph of the key points. The generic model can be trained on datasets of images of different persons with different body shapes and poses. The generic model and the segmentation mask can be further used to generate a 3D model of the body to be used for animation. The 3D model may substantially fit a silhouette of the body. The 3D model may include a set of joint points indicating locations of joints in the body, a reconstructed mesh of 3D points, skinning weights for the 3D points in reconstructed mesh, and a texture map for texturing the precontracted mesh. The 3D model may receive a set of pose parameters representing a pose. An image of the body adopting the pose can be rendered based on the 3D model and the set of pose parameters.

The 3D model can be further used to animate the body in the input image. For example, a series of further sets of pose parameters representing further poses can be provided to the 3D model to generate a series of frames. Each of the generated frames may include an image of the body adopting one of the further poses. The generated frames can be further used to generate a video featuring the body performing the motion, wherein, while performing the motion, the body adopts the further poses. The series of the further sets of pose parameters can be selected from a motions database. Each of the motions in the motions database can represent a motion in the form of a set of pose parameters. Motions in the motions database may be pre-generated using a motion capture movements of real actors performing the motions. Motions in the motions database may be also pre-generated using a generic model and editor for visualization of the generic model.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

According to one embodiments of the disclosure, a method for single image-based real-time body animation is provided. The method may include receiving, by a computing device, an input image. The input image may include a body of a person. The method may further include segmenting, by the computing device, the input image into a body portion and a background portion. The body portion may include pixels of the input image corresponding to the body of the person. The method may also include fitting, by the computing device, a model to the body portion. The model can be configured to receive a set of pose parameters representing a pose of the body and generate, based on the set of pose parameters, an output image. The output image may include an image of the body adopting the pose. The method may also include receiving, by the computing device, a series of further sets of pose parameters. Each of the further sets of pose parameters may represent at least one of further poses of the body. The further sets of pose parameters may be generated using a generic model. The method may include providing, by the computing device, each of the series of further sets of pose parameters to the model to generate a series of output images of the body adopting the further poses. The method may also include generating, by the computing device and based on the series of output images, an output video. Each frame of the output video may include at least one of the output images.

The segmenting of the input image can be performed by a neural network. The series of further sets of pose parameters can represent one or more motions. The generation of the series of further sets of pose parameters using the generic model can be performed by capturing one or more motions performed by one or more actors and digitizing the one or more motions. In a further example embodiment, the generation of the series of further sets of pose parameters using the generic model can be performed in an editor associated with the generic model.

The model may include a set of joint points in a three-dimensional (3D) space. The joint points may indicate locations of joints in the body. The model may include a mesh including a mesh points in the 3D space. Each of the mesh points can be assigned a set of skinning weights. Each of the skinning weights can be associated with at least one of the joint points. The model may include a texture map to generate a texture on the mesh.

The set of pose parameters may include rotational angles of the joint points with respect to a reference point. The generation of the output image may include transforming the mesh by transforming the mesh points. Each of the mesh point can be rotated by an angle. The angle can be determined based on the rotational angles of the joint points and the skinning weights. The generation the output image may further include applying the texture map to the transformed mesh to generate a texture of the transformed mesh.

The fitting of the model may include determining, based on the body portion, a generic model. The generic model may include a set of key points indicative of the joints in the body and a set of shape parameters indicative of a shape of the body. The fitting may further include determining, based on the body portion, a first silhouette of the body image and determining, based on the generic model, a second silhouette of the body image. The fitting may further include determining a set of pairs of points. Each of the pairs of points can include a first point located on the first silhouette and a second point located on the second silhouette. The fitting may further include warping, based on the set of the pairs of points, the generic model to obtain a warped model. The fitting may further include determining, based on the warped model, the mesh and the set of joint points.

The set of joint points can be generated based on the mesh. The set of joint points can include the set of key points. The texture map can be generated by unwrapping the mesh to generate a two-dimensional (2D) representation of the mesh. The generation of the texture map may further include, determining, for each face of the 2D representation of the mesh, whether the face corresponds to a part of the body visible in the input image. If the face corresponds to the part of the body visible in the input image, a segment of the body portion can be assigned to the face of the 2D representation of the mesh. If the face does not correspond to the part of the body visible in the input image, a predicted face can be generated based on the body portion and the predicted face can be assigned to the face of the 2D representation of the mesh.

The set of key points can be determined by a first neural network and the generic model can be determined by a second neural network.

According to another embodiment, a system for single image-based real-time body animation is provided. The system may include at least one processor and a memory storing processor-executable codes, wherein the at least one processor can be configured to implement operations of the above-mentioned method for image-based body real-time animation upon execution of the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for single image-based real-time body animation.

FIG. 1 is a block diagram showing an example environment 100, wherein a method for single image-based real-time body animation can be practiced. The environment 100 may include a computing device 105. The computing device 105 can refer to a mobile device such as a mobile phone, a smartphone, or a tablet computer. In further embodiments, however, the computing device 105 can refer to a personal computer, laptop computer, netbook, set top box, television device, multimedia device, personal digital assistant, game console, entertainment system, infotainment system, vehicle computer, or any other computing device.

In certain embodiments, the computing device 105 may include a system 200 for single image-based body animation. The system 200 can be implemented as instructions stored in a memory of the computing device 105 and executable by one or more processors of the computing device 105. The system 200 can receive an input image 110 and a set of pose parameters 130. The input image may include at least a body 115 of a person and a background 120. In some other embodiments, the input image can be stored in the computing device 105 or in a cloud-based computing resource the computing device 105 being communicatively connected to.

The set of pose parameters 130 may represent one or more pose that the body 115 may adopt. In some embodiments, the pose parameters may represent rotational angles of key points associated with the body 115 with respect to a reference point in a three-dimensional (3D) space or axes in the 3D space. For example, the key points can represent joints (also referred as joint points) in a skeleton associated with the body 115. When the key points are rotated according to the rotational angles, the body 115 may adopt a pose associated with the rotational angles.

In some embodiments, the system 200 may analyze the input image and generate a frame 150. The frame 150 may include an image of the body 115 adopting a pose associated with the pose parameters. Optionally, the frame 150 may also include images of other objects, for example, an image of background 120 of the input image 110. The set of pose parameters 130 may represent a set of consecutive poses that the body 115 may take during a specific motion, such as a dance move, an acrobatic jump, a fighting move, and so forth. The system 200 may generate a set of consecutive frames, wherein each of the consecutive frames corresponds to one of the consecutive pose parameters. The system 200 may further generate, based on the set of consecutive frames, an output video 140. The output video may include images of the body 115 performing the specific motion defined by the set of the consecutive pose parameters.

Figure 2:
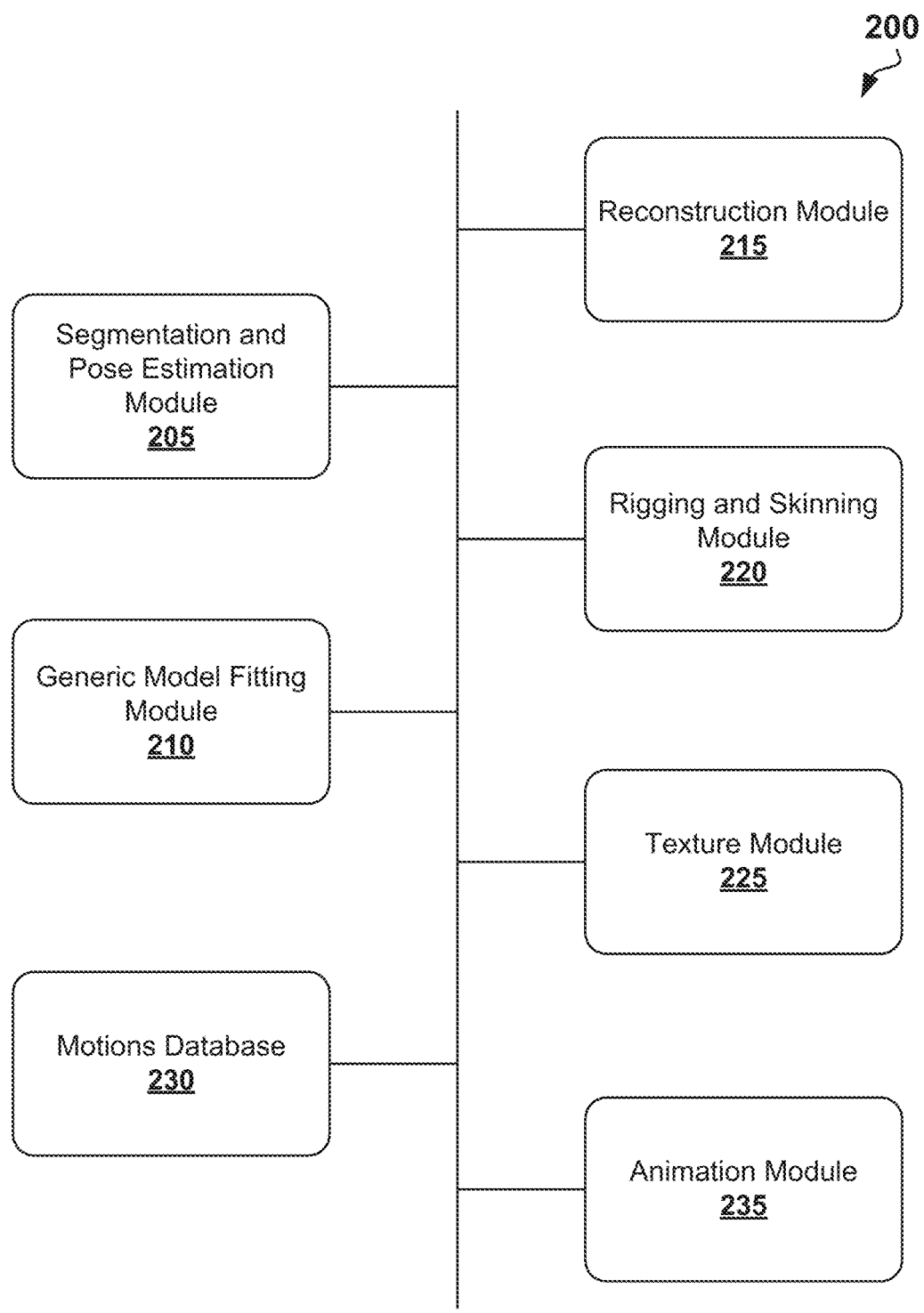
FIG. 2 is a block diagram showing a system for single image-based body animation, in accordance with an example embodiment.

FIG. 2 is a block diagram showing a system 200 for single image-based body animation, in accordance with an example embodiment. The system 200 may include a segmentation and pose estimation module 205, a generic model fitting module 210, a reconstruction module 215, a rigging and skinning module 220, a texture module 225, a motions database 230, and an animation module 235.

The segmentation and pose estimation module 205 can be configured to receive the input image 110. The input image 110 may include pixels representing an image of the body 115 of a person. The pose estimation module 205 can be configured to generate a segmentation mask. The segmentation mask can be an image showing a silhouette of the person on the input image 110.

Figure 3:
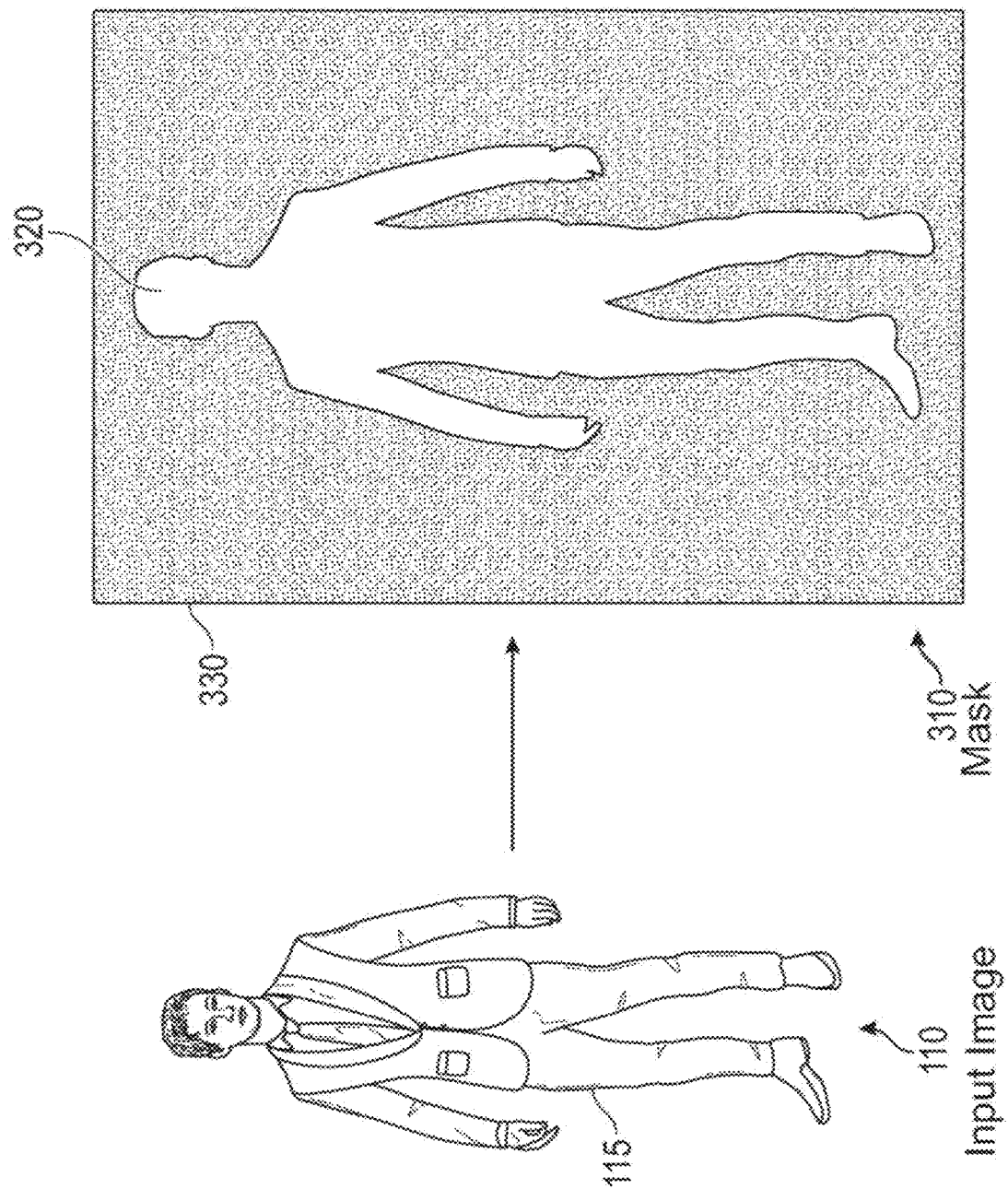
FIG. 3 showing an example input image and a segmentation mask showing a silhouette of the person.

FIG. 3 is showing an example in input image 110 and a segmentation mask 310 showing a silhouette of the person. The segmentation mask may include "white" pixels corresponding to the pixels of the body 115 of the person (a body portion 320) and "black" pixels corresponding to rest pixels (a background portion 330) in the input image 110.

The segmentation of the input image in the body portion 320 and the background portion 330 can be carried out by a neural network configured to determine, for each pixel on the input image 110, whether the pixel corresponds to the body of the person or not. An architecture of the neural network performing the segmentation may include sequential convolutions followed by transposed convolutions and up samplings. The architecture may also include symmetric layers and "bridges" between those symmetric layers, when data is passed from earlier layers to the last layers. In some embodiments, the shape of the input image can be decreased for faster inference. In certain embodiments a padding can be applied to the input image to make the neural network run on images of any shape. The segmentation mask 310 can be further provided to the reconstruction module 215 and the texture module 225.

Referring back to FIG. 2, the pose estimation module 205 may also determine, based on the input image, a pose of the body in the input image. The pose can be determined in a form of a graph. The graph may include a set of key points and edges connecting some of the key points.

FIG. 4 shows an example graph 410 and an example graph 420. Both the graph 410 and the graph 420 include key points tied to joints of a person or key part of the person, such as eyes, a nose, a neck, shoulders, legs, elbows, and so forth. The graphs 420 includes more key points in region of a face of the person than the graph 410.

A further neural network can be configured to determine, based on the input image, a pre-defined graph of the key points (for example graph 410 or graph 420). Each key point can be represented both in XY coordinates in the plane of input image and in XYZ coordinates in the 3D space. The neural network for determination of the key points may have lightweight convolutions with a special architecture. For example, separate convolutions can be used for determining XY coordinates and determining XYZ coordinates. The neural network can be trained in a supervised manner based on significant amount of prepared provable information ("ground truth" data). The graph of key points can be further provided to the generic model fitting module 210.

Referring back to the FIG. 2, the generic model fitting module 210 can be configured to generate a generic model based on the input image and the graph of the key points. The generic model may represent a general person's appearance and a pose of the person. The generic model may include shape parameters. The shape parameters may include a vector of 3D points representing the shape of the person's body. The generic model may further include a vector of pose parameters, wherein each of the pose parameters determine axis-angle rotations of at least joint in the body. The joints of the body can correspond to the key points in the graph of the key points. In some embodiments, the generic model can be used to generate a mesh representing the person's body.

A generic model can be designed to be sophisticated enough to encompass a vast variety of shapes of persons and poses. From other side, the generic model can be not complicated in terms of computation. The generic model can be a parametrized function of a fixed zero model, shape parameters, and pose parameters. The generic mode can represent a variety of human bodies of different shapes and poses that a real person can perform. Representing the generic model as a parameterized function can allow to save memory of the computing device and may allow to compute motions with the use of optimized matrix calculations to increase speed of computations.

The generic model can be trained by a neural network on two datasets. A first dataset may include 3D scans of people in different poses. The second dataset may include scans of people's bodies of different shapes. The goal of the training to optimize trainable parameters of the generic model to minimize difference between the scans and images reconstructed with the generic model. Because the two datasets can differ, the parameters of the generic model related to a pose can be trained based on the first dataset and parameters related to a shape can be trained based on the second dataset The generic model may also include pose parameters related to a head of person. The pose parameters related to head can be used to represent eyebrows, jaw, and so forth. A third dataset that includes face shapes and facial expressions can be used to learn the pose parameters related to the head of the person. The parameters trained on the first dataset, the second dataset, and the third dataset can be aligned to make the parameters affect the generic model in the same way, even though they were trained on different datasets.

In some embodiments, the parameters learned by the generic model may include skinning weights, shape coefficients, pose parameters, and joint regressors. Skinning weights may represent values used to determine how each joint affects each vertex of a mesh associated with the generic model. The mesh may represent shape of the body of the person. The skinning weights can be used to animate the mesh. The skinning weights can be represented by a $N_{joints} \times N_{vertices}$ matrix, wherein $N_{joints}$ is number of joints and $N_{vertices}$ is number of vertices in the mesh. Shape coefficients may be used to alter initial generic model using the shape parameters in order to make the generic model appropriately shaped in terms of height, weight, waist circumference, low hip girth, and so forth. Joint regressors may include values used to determine initial positions of joints of the person with respect to the shape of the person. The joint parameters can be represented by a matrix similar to the matrix for the skinning weights. After training, the generic model may generate a shape and a pose of a human body based on a set of shape parameters and a set of pose parameters.

The generic model can be fitted to the input image 110 using a neural network. The neural network can be configured to pass the input image through a convolutional encoder. Output of the convolutional encoder can be further passed to an iterative regressor that outputs the shape parameters and pose parameters of the generic model. The iterative regressor may minimize a reprojection error. The reprojection error can be calculated as a difference between real joints of the person on the input image and predicted joints.

$$L_{reproject}=E_i^K|x_{real}(i)-x_{pred}(i)|^2,$$

wherein K is the number of the joints, $x_{real}(i)$ are coordinates of real joints, and $x_{pred}(i)$ are coordinates of the predicted joints. Only currently visible joints can be taken into account in the reprojection error.

The iterative regressor may include a generative adversarial network (GAN). The GAN can be used to ensure that generated generic model looks like a real human mesh. A conventional GAN objective can be used, which is given by formula:

$$\min_D \max_G E_{x \sim p_{data}} \log(D(x)) + E_{z \sim p_{gen}} \log(1-D(G(z))).$$

To implement the neural network on a mobile device, convolution can be performed by methods similar to the methods used in MobileNet. The GAN can be implemented using capabilities of frameworks like TensorFlow. The generic model can be provided to the reconstruction module 215.

The reconstruction module 215 can be configured to generate, based on the generic model and a segmentation mask, a 3D model to be used in animation. The generic model can describe limited space of human shapes. The generic model may not represent clothes, hair, fingers positions on hands, and other specific details of person. The generic model can be used to create the 3D model. The 3D model may depict as many as possible details of a specific person shape. Specifically, the 3D model can be constructed to fit substantially exactly a silhouette of a person in the input image. In other words, the 3D model can be constructed to cover a silhouette in the segmentation mask. In further embodiments, the 3D model can be constructed to cover hair, clothes, and fingers of the person on the input image, to make the animation of the 3D model look realistic.

The 3D model may include a reconstructed mesh and a set of joint points in three-dimensional (3D) space. The joint points may indicate locations of joints in the body. The reconstructed mesh may include 3D points different from 3D points of a mesh of the generic model. Each of the points of the reconstructed mesh can be assigned a set of skinning weights. Each of the skinning weights can be associated with at least one of the joint points. The 3D model may further include a texture map to generate a texture on the mesh.

The reconstruction module 215 can generate a depth map, a normal map, and a barycentric map of the generic model generated by the generic model fitting module 210. In some embodiments, the depth map, the normal map, and barycentric map can be presented via a portable network graphic (png) images of both a front side and a back side of the generic model. The reconstruction module 215 can determine a first silhouette and a second silhouette of the body of person in the input image. The first silhouette can be determined based the segmentation mask. The second silhouette can be determined as a projection of the generic model onto the input image.

Figure 5:
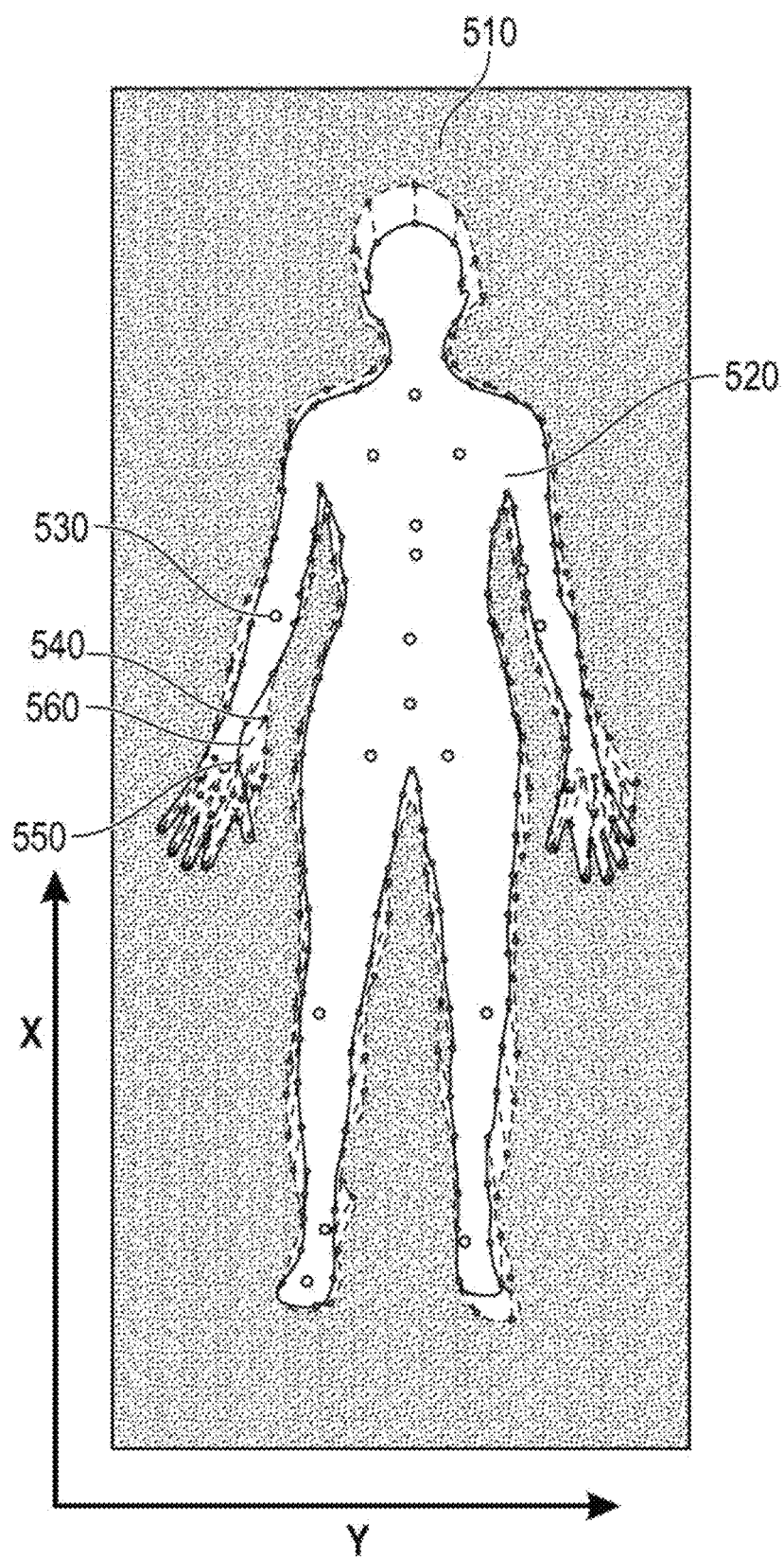
FIG. 5 shows an example first silhouette determined based on the segmentation mask and an example second silhouette determined as a projection of the generic model onto the input image.

FIG. 5 shows an example first silhouette determined based on the segmentation mask and example second silhouette determined as a projection of the generic model onto the input image. The reconstruction module 215 can match boundary points 540 located on a contour of the first silhouette to boundary points 550 located on a contour of the second silhouette. The boundary points 540 can be determined using coordinates of key points 530 of the body in the input image. The key points 530 can be determined by a neural network in the pose estimation module 205. The boundary points 550 can be determined based on joint locations determined based on the generic model. Each of the boundary points 540 can be found as a point on the contour of the first silhouette nearest to one of the key points 530. Each of the boundary points 550 can be found as point on the contour of the second silhouette nearest to one of joint locations determined based on the generic model.

After boundary points 540 and the boundary points 550 are matched, the reconstruction module 215 may interpolate linearly 560 between the boundary points 540 and the boundary points 550 to obtain points between the boundary points. The matching the boundary points using the key points 530 and the joint locations can be faster and more accurate than matching the boundary points based on minimizing distances with dynamic programming as it is carried out in currently existing methods.

The normal map, the depth map, and barycentric map can be further warped by a Mean-Value-Coordinates algorithm using the information on the points between the boundary points. As result the warped normal map, the warped barycentric map and the warped depth map are fitted to the original person's silhouette in the segmentation mask and can be further used to determine a 3D model for animation.

Figure 6:
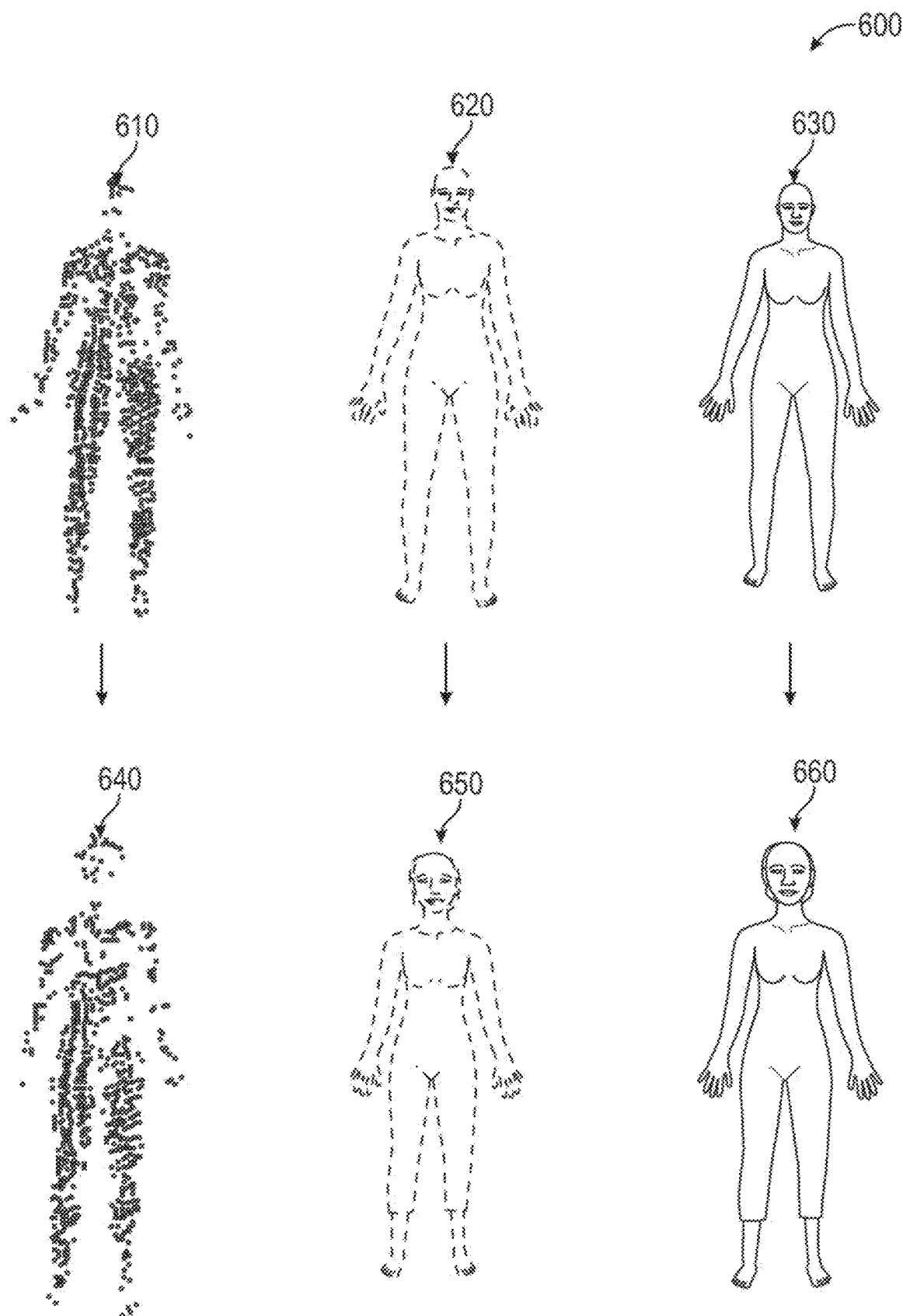
FIG. 6 shows frontal sides of an example barycentric map, example depth map, example normal map, corresponding warped barycentric map, warped depth map, and warped normal map.

FIG. 6 shows frontal sides of an example barycentric map 610, an example depth map 620, and an example normal map 630 and corresponding warped barycentric map 640, warped depth map 650, and warped normal map 660. The reconstruction module 215 may store the depth map by storing, for each point (for example a pixel in the input image), coordinate (x, y) and a z value. The normal map can be stored by storing, for each (x, y) coordinates, a normal vector at this point, which is a 3D vector (Nx, Ny, Nz) in the axis coordinates x, y, z. The barycentric map can be stored by storing, for each (x, y) coordinates, 1) an index of a face in a mesh associated with generic model, wherein the face includes the projected point (x, y); and 2) first two barycentric coordinates (alpha and beta). The third barycentric coordinate can be calculated from the alpha and beta.

Figure 7:
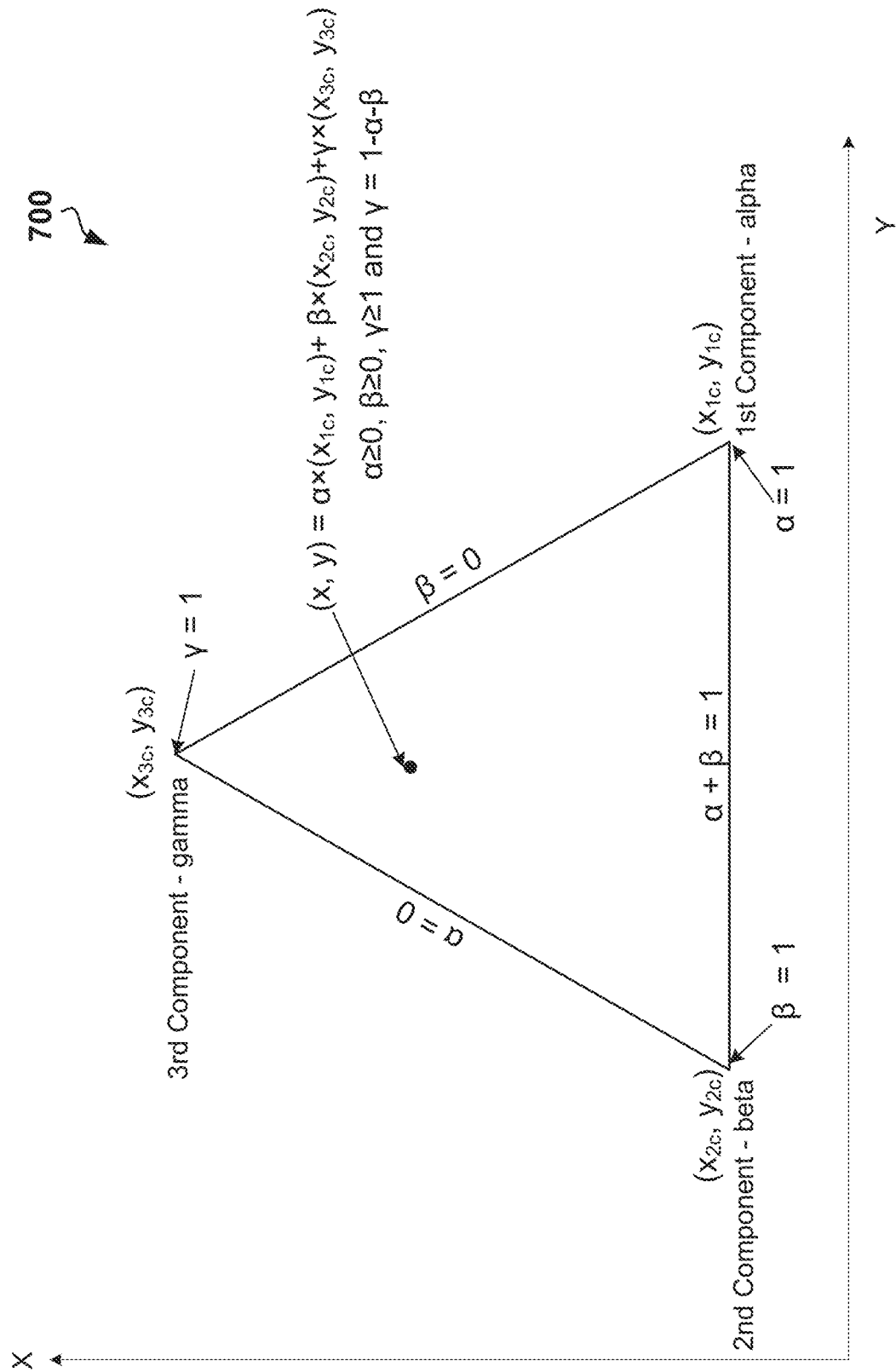
FIG. 7 shows a visualization of the barycentric coordinates.

FIG. 7 shows a visualization of the barycentric coordinates.

Referring back to FIG. 2, the reconstruction module 215 can further build a reconstructed mesh. First, a point cloud can be generated based on the warped depth map and the warped normal map. In the warped depth map and the warped normal map each point is represented by 6 values: coordinates (x, y, z) and normal vector (Nx, Ny, Nz). Generation of the point cloud may include generation of dense point cloud of (x, y, z) points. A first mesh for a front size surface of body and a second mesh for a back side surface of the body can be further generated separately by traveling through the point cloud. The first mesh and the second mesh can be further merged into one reconstructed mesh representing 3D surface of the body. The reconstructed mesh may fit the contour of silhouette in the segmentation mask. During the generation of the reconstructed mesh, the reconstruction module 215 may store, for each vertex of the mesh, (x, y) coordinates of depth map and normal map of the generic model before warping.

FIG. 8 shows an example point cloud 810 and a mesh 820 generated based on the point cloud 810.

FIG. 9 shows an example warped depth map 910, an example warped normal map 920, an example point cloud 930 generated based on the warped depth map 910 and warped normal map 920, and an example mesh 940 generated based on the point cloud 930.

Figure 10:
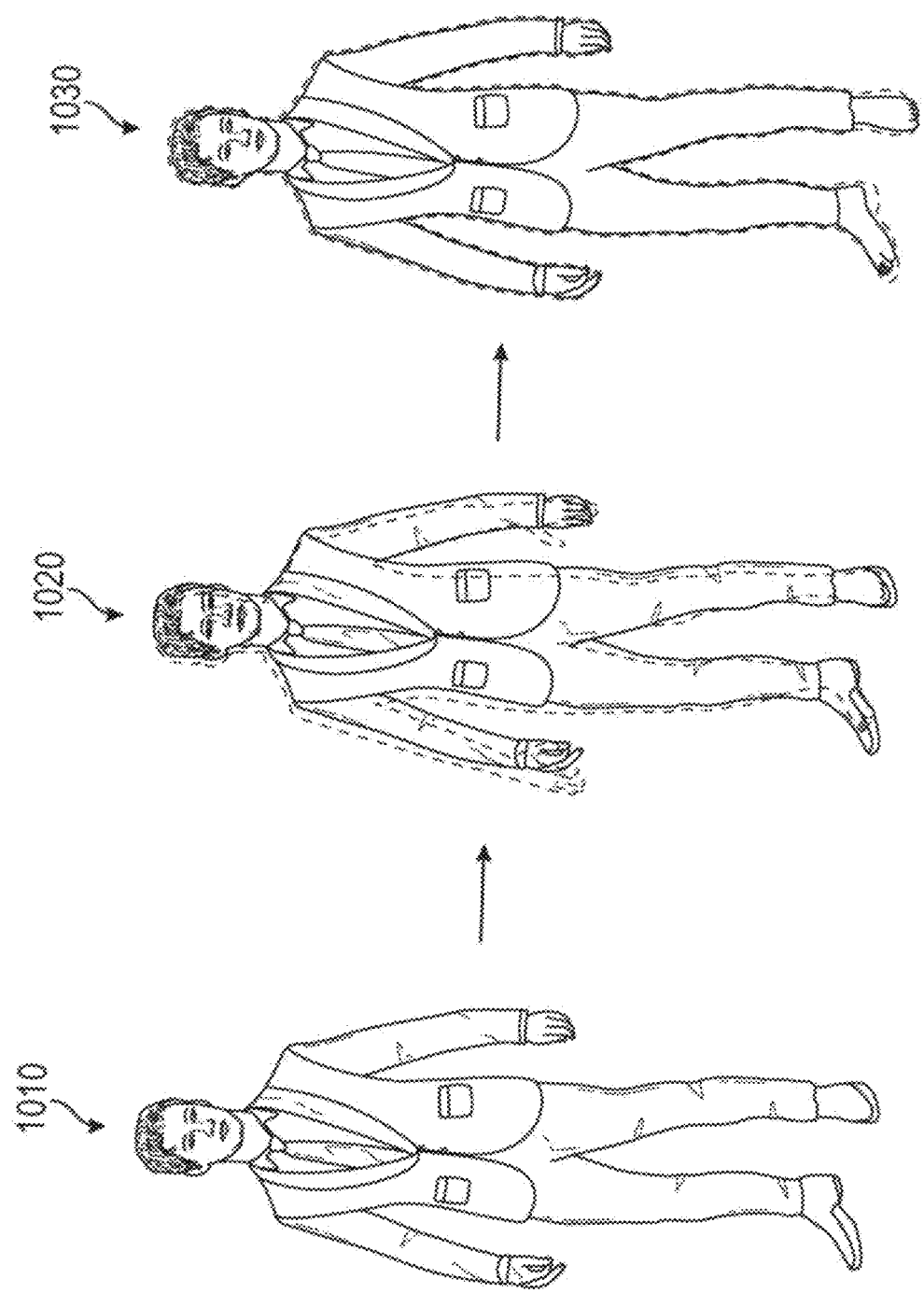
FIG. 10 shows an example input image, a mesh of a generic model fitted to the input image, and a reconstructed mesh.

FIG. 10 shows an example input image 1010, a mesh of a generic model 1020 fitted to the input image 1010, and a reconstructed mesh 1030 of the 3D model. The reconstructed mesh 1030 may match the silhouette of a person in input image 1010.

Referring back to FIG. 2, the rigging and skinning module 220 can determine skinning weights for vertices in the reconstructed mesh generated by the reconstruction module 215. The skinning weights and locations of joint points can be further used to animate the mesh.

In some embodiments the locations of joint points can be taken to be the same as in the generic model determined in generic model fitting module 210. In other embodiments, the locations of the joint points can be derived by applying warping to the skinning weights and joint regressors of the generic model. In certain embodiments, the location of joint points can be determined by warping positions of the joint points into a start pose. The warping can be determined based on 2D projections of the positions of the joint points in the start pose.

The skinning weights for a vertex in the reconstructed mesh can be determined using the following procedure. For each vertex in the reconstructed mesh, the rigging and skinning module 220 may determine (x, y) coordinates on the warped depth map, warped normal map, and warped barycentric maps. The rigging and skinning module 220 may further determine, based on warped barycentric map, a point in the generic model corresponding to the (x, y) coordinates. The rigging and skinning module 220 may further determine, based on the point, index of a face of a mesh of the generic module and barycentric coordinates of the face. The skinning weight for the point can be determined as weighted average of skinning weights (according to generic model) of three vertices of the face, wherein the weights are determined by the barycentric coordinates of the face. This way of determining of skinning weights can be faster than warping skinning weights matrix because it allows to determine the skinning weights for vertex on fly without processing and storing all the skinning weights for all vertices in the reconstructed mesh. However, in certain embodiments, the skinning weight matrix can be determined for all vertices of the reconstructed mesh and stored in a memory of the computing device.

The texture module 225 can generate a texture map for the reconstructed mesh. The texture map can be generated using the input image and the segmentation mask. The generation of the texture map may include UV unwrapping of the reconstructed mesh to obtain a UV texture map. The texture map can be designed in a such a way that all other reconstructed meshes have the same UV texture map even if the other reconstructed meshes can differ by silhouette, number of vertices and faces. This may allow to transfer a texture from one reconstructed mesh generated for an input image and a segmentation mask to another reconstructed mesh generated for the same input image and the same segmentation mask. This may also allow to modify texture map to change, for example color and clothes in the input image.

UV unwrapping can be defined as a process of flattening a surface of a 3D object to a 2D surface. UV are coordinates (also referred as texture coordinates) of vertices of points the surface.

FIG. 11 shows a process of UV unwrapping of an example 3D surface 1110 to a 2D surface 1120.

Figure 12:
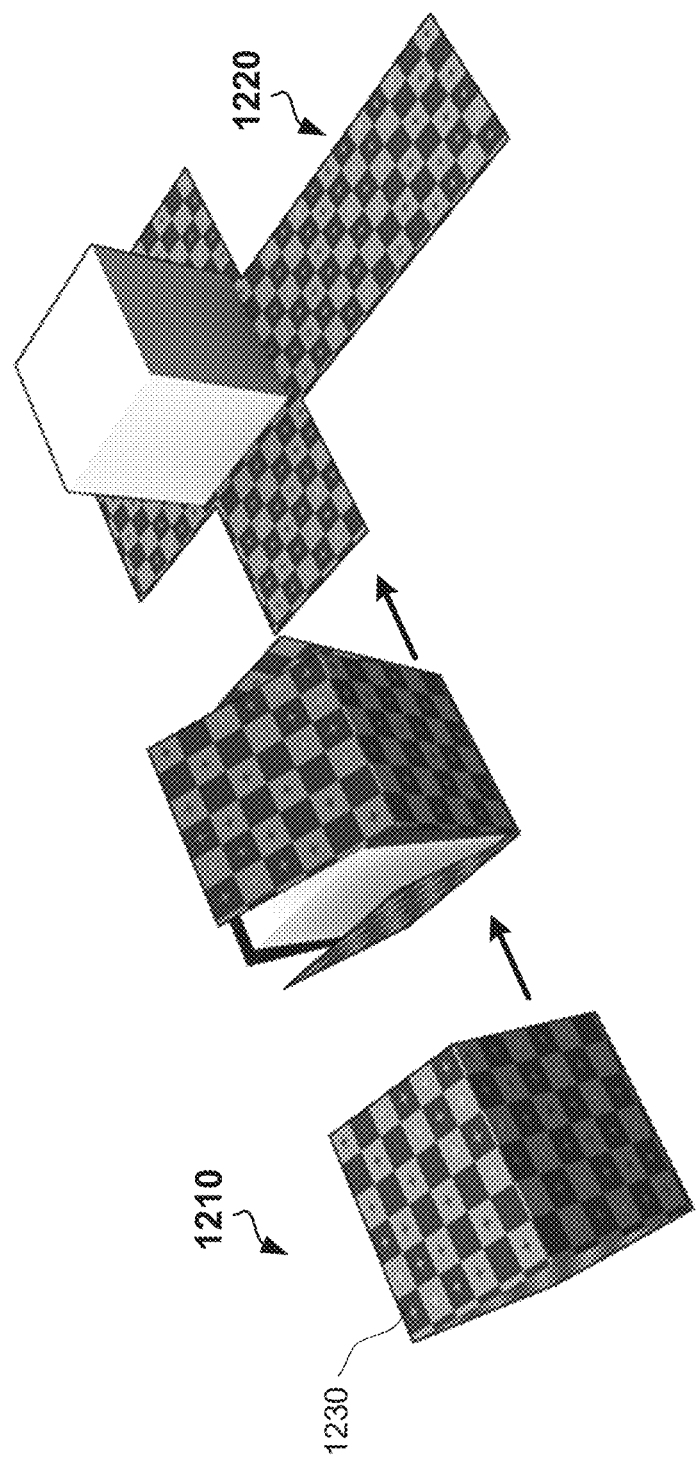
FIG. 12 shows a process of UV unwrapping of an example 3D surface of cube to a 2D surface.

FIG. 12 shows a process of UV unwrapping of an example 3D surface of cube 1210 to a 2D surface 1220. The 2D surface 1220 can be used as texture map for the 3D surface of the cube 1210. It should be noted that two neighbor points lying on two different faces near the edge 1230 of the cube 1210 may correspond to two points in the 2D surface located apart at two different parts of the texture map.

During generating a reconstructed mesh, the reconstruction module 215 may track correspondence between three vertices of a face in the reconstructed mesh and three points A, B, and C (which are not necessarily vertices) in a mesh of the generic model. The generic model may also include a texture map. The texture module 225 may determine coordinates on generic model's texture map corresponding to the vertices of the face in the reconstructed mesh. A face on the texture map of the reconstructed mesh can be further generated using the triangle on generic model's texture map determined by the three points A, B, and C. If the three points A, B, and C are located on different parts of the generic model's texture map, then the triangle A, B, C can be split into triangles, wherein each of the triangles lays on the same part of the generic model's texture map. Described approach allows to create UV unwrapping for reconstructed meshes that have the same boundaries and semantics. For example, a texture for a person's face can be located at the same place in the texture maps generated for all reconstructed meshes of 3D model.

The projection of the reconstructed mesh matches person's silhouette. Therefore, a front side of the reconstructed mesh (visible part of the texture) can be textured as is, by taking corresponding segment of the input image including a body of the person, as a visible part of the texture. Inpainting unseen parts of texture of the reconstructed mesh may be performed in different ways. For example, the opposite side of the reconstructed mesh may be textured by either mirroring a texture of front side or synthesizing a texture based on the front side. All unseen parts of the texture can be also filled using algorithmic or neural network based inpainting methods. Inpainting can be performed using coordinate-based methods, wherein the texture is represented not as a colored picture, but coordinates of points on the original input image, wherein the colors are to be taken from. In this way the texture may have clear and realistic colors without blurring.

A neural network for inpainting the unseen parts can be trained based on images of a person from different views. Unseen texture can be predicted by the neural network. During the training the neural network, 3D model may generate an image with an unseen texture from a certain viewpoint. The rendered images can be then compared with "ground truth". Backpropagation can be then used to determine weights of the neural network.

In some embodiments, to obtain a coherent and plausible well-looking textured mesh, unseen parts can be painted first in image generated by 3D model and then transferred to the texture map. 3D model can generate an image from different view angles with unseen parts highlighted. Then a generative neural network or a simpler algorithm can be used to fill "holes" on the image. The textured mesh can be back projected to texture map of the 3D model, replacing previously absent parts with the restored parts.

Referring back to FIG. 2, the animation module 235 can generate, based on a sequence of sets of pose parameters, frames of output video featuring a motion of person in the input image. The sequence of sets of pose parameters can be stored in a motions database 230. A sequence of the sets of pose parameters can represent at least one motion. Each set in the sequence of sets of pose parameters can be used to generate one frame of the output video. The sequences of the sets of pose parameters can be obtained using a motion capture of movements performed by real actors and digitizing the movements. In some embodiments, the sequences of the sets of pose parameters can be artificially generated by a 3D motion designer operating with a generic model in editors. The motions database may include different sequences of sets of pose parameters representing different motions, such as dance, acrobatics, and so forth.

Each frame can be generated by recomputing the 3D model using a set of the pose parameters corresponding to a pose. As a result, new positions of vertices of the reconstructed mesh in 3D space can be generated and textured using the texture map to generate an image of person's body adopting the pose. The image can be inserted to the frame. A standard animating procedure for animating rigged models can be used which includes computing rotation matrices for each joint point by the following:

$$C_k = \prod_{j \in A(k)} \begin{bmatrix} rot(w_j) & j_j \\ \vec{0} & 1 \end{bmatrix},$$

wherein rot ( . . . ) is the rotation part of a 4×4 rigid matrix, and j is a translation part of the 4×4 rigid matrix.

The rotational matrixes can be translated to dual quaternions, blended with skinning weights, normalized, and then translated back to rigid transformation matrix. The rigid transformation matrix is needed to ensure rigidity of blended transformation and prevent skinning artefacts. Rotation-translation motion (rigid transformation) with a dual quaternion can be defined as:

$$q_0 + \frac{\epsilon}{2}(t_0 i + t_1 j + t_2 k) q_0.$$

Dual quaternions can be blended as following:

$$BLEND(w, q) = \frac{w_1 q_1 + w_2 q_2 + \ldots + w_n q_n}{\|w_1 q_1 + w_2 q_2 + \ldots + w_n q_n\|},$$

where w—are skinning weights coefficients, q—vector of transformational dual quaternions. In other embodiments, the rotational matrixes can be blended using a linear blend skinning. In these embodiments, the rotational matrixes can be blended by a summation of a liner combination of the rotational matrixes, wherein coefficients of the linear combination are normalized.

FIG. 13 shows an animation of an example 3D model 1300. The image 1310 includes an image of body generated by the 3D model based on a first set of pose parameters from a sequence of sets of pose parameters. The image 1320 includes an image of body generated by the 3D model based on a second set of pose parameters from the sequence of sets of pose parameters.

Figure 14:
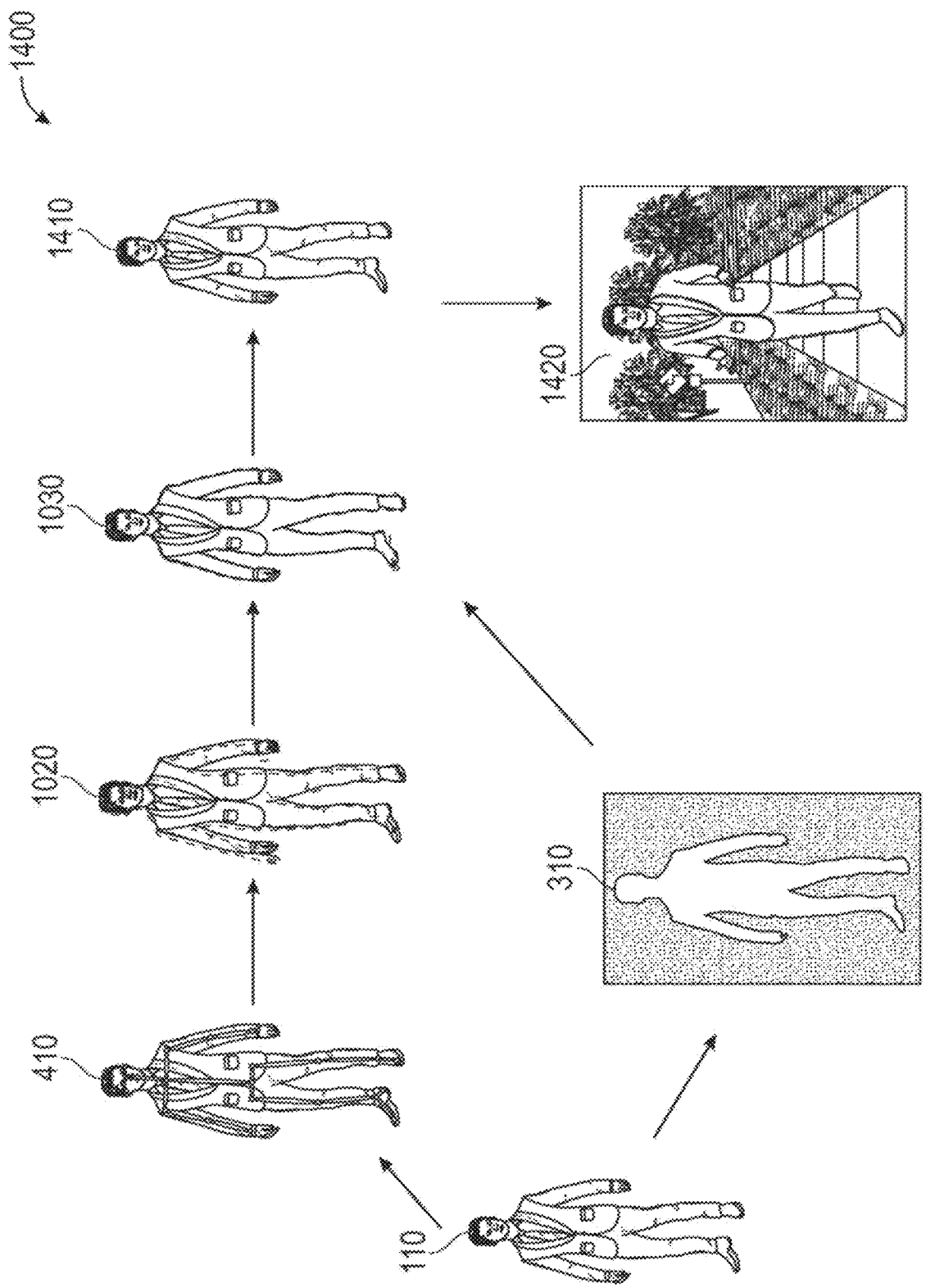
FIG. 14 is a flow chart showing example transformations of a single image during a process of animation.

FIG. 14 is a flow chart showing example transformations of a single image during a process of animation. The process 1400 can be performed by the system 200 shown in FIG. 2. The input image 110 may include a body of a person. The input image 110 can be provided to the segmentation and pose estimation module 205 to generate a segmentation mask 310 for silhouette of the person. The pose estimation module 205 may also generate a set of key points shown by graph 410 and indicating locations of joints of the body of person. The set of key points shown by graph 410 and input image can be further used by the generic model fitting module 210 to generate a generic model 1020. The generic model 1020 and the segmentation mask 310 can be provided to the reconstruction module 215 to generate a 3D model to be used in animation. The 3D model can be further processed by the rigging and skinning module 220 to estimate skinning weights. The reconstructed mesh 1030 of the 3D model and the segmentation mask can be further used to generate a texture map to texture the reconstructed mesh. The image 1410 shows an image generated by 3D model, wherein the reconstructed mesh is textured with the texture map. The image 1420 shows a frame including image generated by the animation module 235 based on a set of pose parameters.

Figure 15:
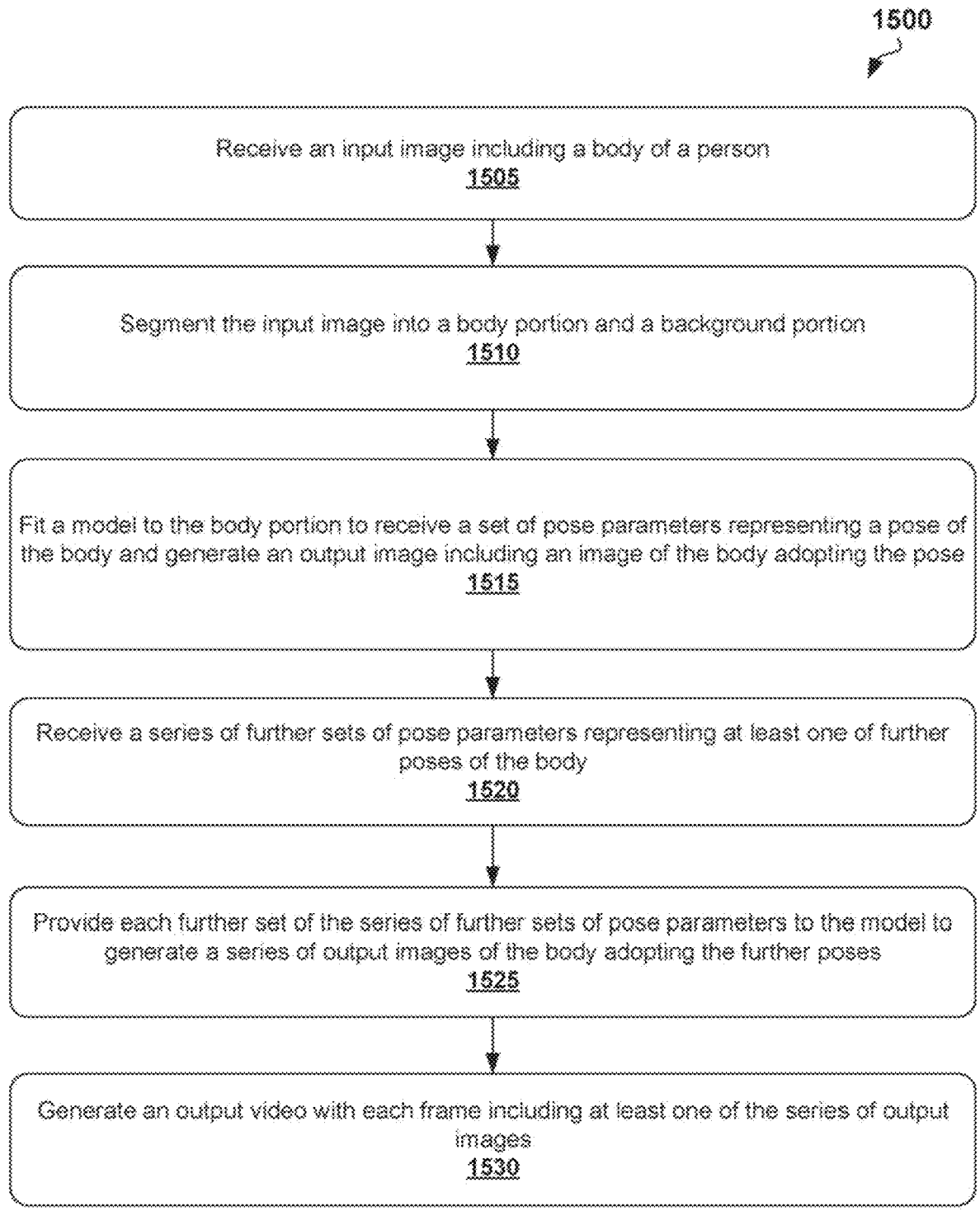
FIG. 15 is a flow chart showing a method for single image-based real-time body animation, according to one example embodiment.

FIG. 15 is a flow chart showing a method 1500 for single image-based real-time body animation, according to one example embodiment. The method 1500 can be performed by computing device 105 and system 200.

The method 1500 may commence, in block 1505, with receiving an input image. The input image including a body of a person.

In block 1510, the method 1500 may include segmenting the input image into a body portion and a background portion. The body portion may include pixels of the input image corresponding to the body of the person.

In block 1515, the method 1500 may include fitting a model to the body portion. The model can be configured to receive a set of pose parameters representing a pose of the body and generate, based on the set of the pose parameters, an output image. The output image may include an image of the body adopting the pose.

In block 1520, the method 1500 may include receiving a series of further sets of further pose parameters. Each of the further sets may represent at least one of further poses of the body. The further sets of pose parameters may be generated using a generic model. The series of further pose parameters may represent one or more motions. In an example embodiment, the generation of the series of further sets of pose parameters using the generic model may be performed by capturing one or more motions performed by one or more actors and digitizing the one or more motions. In a further example embodiment, the generation of the series of further sets of pose parameters using the generic model may be performed in an editor associated with the generic model.

In block 1525, the method 1500 may include providing each further set of the series of further sets of pose parameters to the model to generate a series of output images of the body adopting the further poses.

In block 1530, the method 1500 may include generating, based on the series of output images, an output video. Each frame of the output video may include at least one output image of the series of output images.

Figure 16:
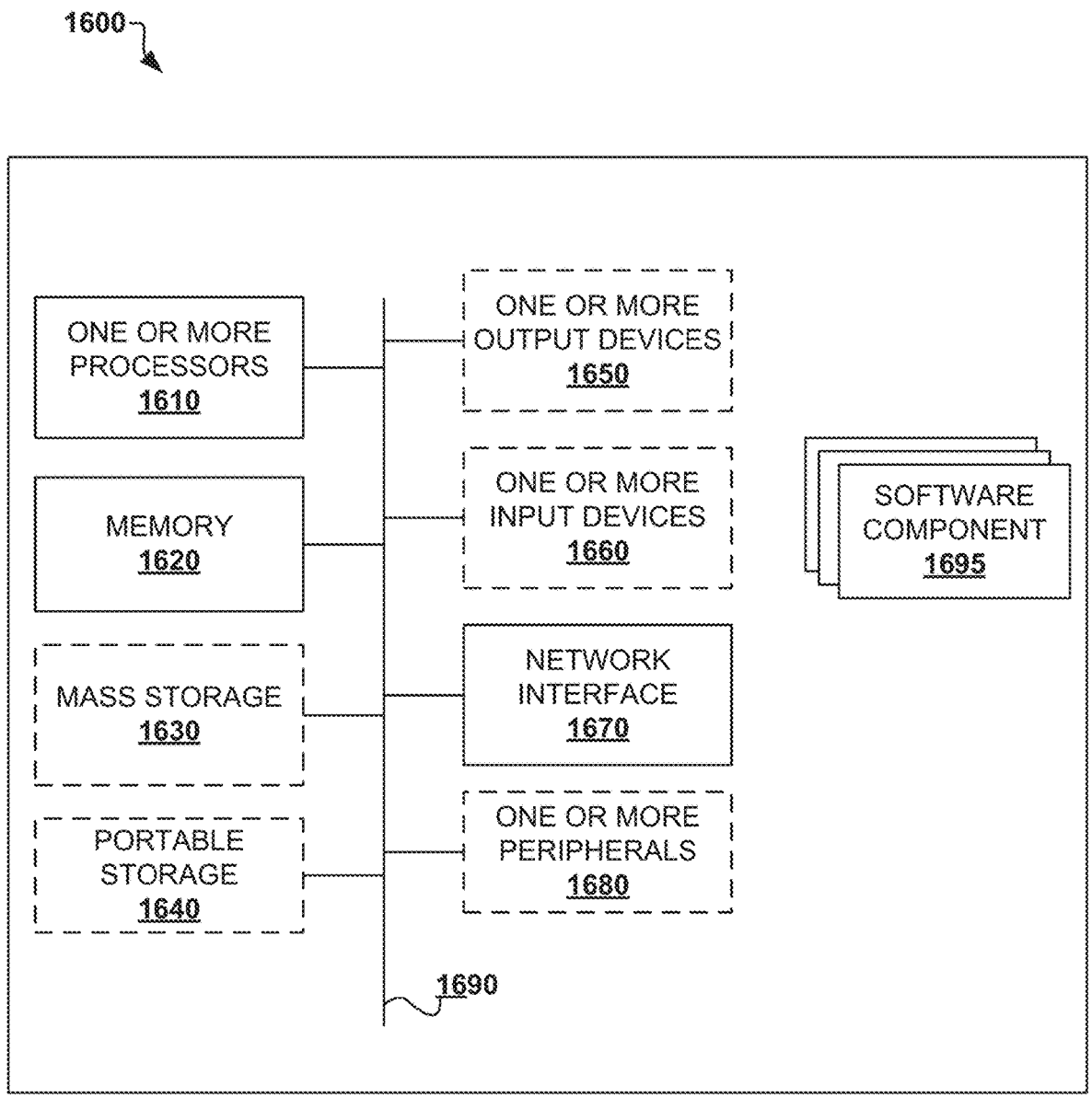
FIG. 16 shows an example computer system that can be used to implement the methods for single image-based real-time body animation.

FIG. 16 illustrates an example computing system 1600 that may be used to implement methods described herein. The computing system 1600 may be implemented in the contexts of the likes of the computing device 105 and the system 200.

As shown in FIG. 16, the hardware components of the computing system 1600 may include one or more processors 1610 and memory 1620. Memory 1620 stores, in part, instructions and data for execution by processor 1610. Memory 1620 can store the executable code when the computing system 1600 is in operation. The computing system 1600 may further include an optional mass storage device 1630, optional portable storage device 1640, one or more optional output devices 1650, one or more optional input devices 1660, an optional network interface 1670, and one or more optional peripheral devices shown as one or more peripherals 1680. The computing system 1600 can also include one or more software components 1695 (e.g., ones that can implement the method for portrait animation as described herein).

The components shown in FIG. 16 are depicted as being connected via a single bus 1690. The components may be connected through one or more data transport means or data network. The processor 1610 and memory 1620 may be connected via a local microprocessor bus, and the mass storage device 1630, peripherals 1680, portable storage device 1640, and network interface 1670 may be connected via one or more input/output (I/O) buses.

The mass storage device 1630, which may be implemented with a magnetic disk drive, solid-state disk drive, or an optical disk drive, is a non-volatile storage device for storing data and instructions for use by the processor 1610. Mass storage device 1630 can store the system software (e.g., software components 1695) for implementing embodiments described herein.

Portable storage device 1640 operates in conjunction with a portable non-volatile storage medium, such as a compact disk (CD), or digital video disc (DVD), to input and output data and code to and from the computing system 1600. The system software (e.g., software components 1695) for implementing embodiments described herein may be stored on such a portable medium and input to the computing system 600 via the portable storage device 1640.

The optional input devices 1660 provide a portion of a user interface. The input devices 1660 may include an alphanumeric keypad, such as a keyboard, for inputting alphanumeric and other information, or a pointing device, such as a mouse, a trackball, a stylus, or cursor direction keys. The input devices 1660 can also include a camera or scanner. Additionally, the computing system 1600 as shown in FIG. 16 includes optional output devices 1650. Suitable output devices include speakers, printers, network interfaces, and monitors.

The network interface 1670 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1670 may be a network interface card, such as an Ethernet card, optical transceiver, radio frequency transceiver, or any other type of device that can send and receive information. The optional peripherals 1680 may include any type of computer support device to add additional functionality to the computer system.

The components contained in the computing system 1600 are intended to represent a broad category of computer components. Thus, the computing system 1600 can be a server, personal computer, hand-held computing device, telephone, mobile computing device, workstation, minicomputer, mainframe computer, network node, or any other computing device. The computing system 1600 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for single image-based real-time body animation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for single image-based body animation, the method comprising:
    receiving, by a computing device, an input image, the input image including an image of a body of a person;
    fitting, by the computing device, a model to the image of the body of the person, wherein the model is configured to:
        receive a set of pose parameters corresponding to a pose of the body; and
        generate, based on the set of pose parameters, an output image, the output image including an image of the body adopting the pose;
    receiving, by the computing device, a further set of pose parameters corresponding to a further pose of the body, wherein the further set of pose parameters is generated using a generic model configured to generate, based on the set of pose parameters, a further output image including a further image of the body adopting the pose, wherein the further image of the body omits at least one feature of the body presented in the output image generated by the model;
    providing, by the computing device, the further set of pose parameters to the model to generate the output image of the body adopting the further pose; and
    generating, by the computing device and based on the output image, a frame of an output video, the frame of the output video including the output image.

2. The method of claim 1, wherein the further set of pose parameters is generated based on a motion video featuring a further person adopting the further pose.

3. The method of claim 1, wherein the further set of pose parameters is generated in an editor associated with the generic model.

4. The method of claim 1, wherein the fitting the model includes:
    determining, by the computing device and based on the image of the body of the person, internal parameters of the generic model;
    determining, by the computing device and based on the image of the body of the person, a first silhouette of the body of the person;
    determining, by the computing device and based on the generic model, a second silhouette of the body of the person; and
    warping, by the computing device and based on the first silhouette and the second silhouette, the generic model to generate the model.

5. The method of claim 4, wherein the generic model is determined by a neural network.

6. The method of claim 4, wherein the internal parameters of the generic model include a set of key points indicative of joints in the body and a set of shape parameters indicative of a shape of the body.

7. The method of claim 1, wherein the model includes:
    a set of joint points in a three-dimensional (3D) space, the joint points indicating a location of joints in the body;
    a mesh including mesh points in the 3D space, each of the mesh points being assigned a set of skinning weights, each of the skinning weights being associated with at least one of the joint points; and
    a texture map to generate a texture on the mesh.

8. The method of claim 7, wherein the set of pose parameters includes rotational angles of the joint points with respect to a reference point; and
    the generating the output image includes:
        transforming the mesh by transforming the mesh points, wherein each of the mesh points is rotated by angles, the angles being determined based on the rotational angles of the joint points and the skinning weights; and
        applying the texture map to the transformed mesh to generate a texture of the transformed mesh.

9. A computing device comprising:
    a processor; and
    a memory storing instructions that, when executed by the processor, configure the computing device to:
        receive an input image, the input image including an image of a body of a person;
        fit a model to the image of the body of the person, wherein the model is configured to:
            receive a set of pose parameters corresponding to a pose of the body; and
            generate, based on the set of pose parameters, an output image, the output image including an image of the body adopting the pose;
        receive a further set of pose parameters corresponding to a further pose of the body, wherein the further set of pose parameters is generated using a generic model configured to generate, based on the set of pose parameters, a further output image including a further image of the body adopting the pose, wherein the further image of the body omits at least one feature of the body presented in the output image generated by the model;
provide the further set of pose parameters to the model to generate the output image of the body adopting the further pose; and
generate, based on the output image, a frame of an output video, the frame of the output video including the output image.

10. The computing device of claim 9, wherein the further set of pose parameters is generated based on a motion video feature a further person adopting the further pose.

11. The computing device of claim 9, wherein the further set of pose parameters is generated in an editor associated with the generic model.

12. The computing device of claim 9, wherein the fitting the model includes:
determining, based on the image of the body of the person, internal parameters of the generic model;
determining, based on the image of the body of the person, a first silhouette of the body of the person;
determining, based on the generic model, a second silhouette of the body of the person; and
warping, based on the first silhouette and the second silhouette, the generic model to generate the model.

13. The computing device of claim 12, wherein the generic model is determined by a neural network.

14. The computing device of claim 12, wherein the internal parameters of the generic model include a set of key points indicative of joints in the body and a set of shape parameters indicative of a shape of the body.

15. The computing device of claim 9, wherein the model includes:
a set of joint points in a three-dimensional (3D) space, the joint points indicate a location of joints in the body;
a mesh including mesh points in the 3D space, each of the mesh points being assigned a set of skinning weights, each of the skinning weights being associated with at least one of the joint points; and
a texture map to generate a texture on the mesh.

16. A non-transitory computer-readable storage medium, the computer-readable storage medium including instructions that, when executed by a computing device, cause the computing device to:
receive an input image, the input image including an image of a body of a person;
fit a model to the image of the body of the person, wherein the model is configured to:
receive a set of pose parameters corresponding to a pose of the body; and
generate, based on the set of pose parameters, an output image, the output image including an image of the body adopting the pose;
receive a further set of pose parameters corresponding to a further pose of the body, wherein the further set of pose parameters is generated using a generic model configured to generate, based on the set of pose parameters, a further output image including a further image of the body adopting the pose, wherein the further image of the body omits at least one feature of the body presented in the output image generated by the model;
provide the further set of pose parameters to the model to generate the output image of the body adopting the further pose; and
generate, based on the output image, a frame of an output video, the frame of the output video including the output image.

17. The non-transitory computer-readable storage medium of claim 16, wherein the further set of pose parameters is generated based on a motion video featuring a further person adopting the further pose.

18. The non-transitory computer-readable storage medium of claim 16, wherein the further set of pose parameters is generated in an editor associated with the generic model.

19. The non-transitory computer-readable storage medium of claim 16, wherein the fitting the model includes:
determining, by the computing device and based on the image of the body of the person, internal parameters of the generic model;
determining, by the computing device and based on the image of the body of the person, a first silhouette of the body of the person;
determining, by the computing device and based on the generic model, a second silhouette of the body of the person; and
warping, by the computing device and based on the first silhouette and the second silhouette, the generic model to generate the model.

20. The non-transitory computer-readable storage medium of claim 19, wherein the generic model is determined by a neural network.

* * * * *